United States Patent
Baldwin

(10) Patent No.: US 8,535,203 B2
(45) Date of Patent: Sep. 17, 2013

(54) SYSTEM AND METHOD FOR IDLE ENGINE STOP

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/454,446

(22) Filed: Apr. 24, 2012

(65) Prior Publication Data

US 2012/0209483 A1   Aug. 16, 2012

Related U.S. Application Data

(63) Continuation of application No. 12/366,708, filed on Feb. 6, 2009, now Pat. No. 8,187,139.

(51) Int. Cl.
*B60W 10/06* (2006.01)
*B60W 10/18* (2012.01)

(52) U.S. Cl.
USPC .......................... 477/200; 475/282

(58) Field of Classification Search
USPC ............. 475/5, 282, 269; 477/7, 8, 11, 15, 477/70, 73, 74, 77, 79, 80, 107, 109, 111, 477/199, 200
See application file for complete search history.

(56) References Cited

U.S. PATENT DOCUMENTS

| | | | |
|---|---|---|---|
| 3,789,698 A * | 2/1974 | Williams | 475/119 |
| 4,046,031 A | 9/1977 | Ott et al. | |
| 4,070,927 A | 1/1978 | Polak | |
| 4,683,776 A | 8/1987 | Klemen | |
| 4,895,236 A * | 1/1990 | Sakakibara et al. | 192/84.6 |
| 5,052,990 A * | 10/1991 | Sakakibara et al. | 475/210 |
| 5,295,924 A | 3/1994 | Beim | |
| 6,471,616 B2 * | 10/2002 | Stevenson | 475/296 |
| 6,547,688 B2 | 4/2003 | Takagi et al. | |
| 6,723,019 B2 * | 4/2004 | Lee et al. | 475/276 |
| 6,802,795 B2 | 10/2004 | Miyazaki et al. | |
| 6,875,154 B2 * | 4/2005 | Mitsutani et al. | 477/107 |
| 6,926,639 B2 * | 8/2005 | Hopper | 477/110 |
| 6,988,974 B2 * | 1/2006 | Kobayashi et al. | 477/3 |
| 7,052,430 B2 * | 5/2006 | Stevenson et al. | 475/278 |
| 7,163,484 B2 | 1/2007 | Klemen | |
| 7,276,011 B2 | 10/2007 | Tabata et al. | |
| 7,702,444 B2 * | 4/2010 | Schiele | 701/53 |
| 2007/0072732 A1 | 3/2007 | Klemen | |
| 2007/0259753 A1 | 11/2007 | Diosi et al. | |

* cited by examiner

*Primary Examiner* — Justin Holmes
(74) *Attorney, Agent, or Firm* — James Dottavio; Brooks Kushman, P.C.

(57) ABSTRACT

An automatic transmission is disclosed providing eight forward ratios and one reverse ratio wherein the first forward ratio is selected by engaging exactly one friction brake using an electro-mechanical actuator. An operating method is disclosed for a vehicle having a transmission with this characteristic. The disclosed operating method permits the engine to be shut off to save fuel while the vehicle is stationary and then to start moving before an engine driven pump creates hydraulic pressure to engage the clutches.

11 Claims, 5 Drawing Sheets

| Gear Number | Description | Number of teeth |
|---|---|---|
| 22 | 1st Sun | 26 |
| 24 | 1st Ring | 76 |
| 28 | 1st Planet | 25 |
| 32 | 2nd Sun | 42 |
| 34 | 2nd Ring | 92 |
| 38 | 2nd Planet | 25 |
| 42 | 3rd Sun | 29 |
| 44 | 3rd Ring | 83 |
| 48 | 3rd Planet | 27 |
| 52 | 4th Sun | 43 |
| 54 | 4th Ring | 79 |
| 58 | 4th Planet | 18 |

Figure 2

| Ratio # | Clutch 60 | Clutch 62 | Brake 64 | Brake 68 | Brake 70 / OWC 66 | Speed Ratio | Step Size |
|---|---|---|---|---|---|---|---|
| Reverse | | | X | | X | -2.982 | 69% |
| 1st | | | | X | X | 4.305 | |
| 2nd | | | X | X | | 2.879 | 1.50 |
| 3rd | X | | | X | | 1.780 | 1.62 |
| 4th | | X | | X | | 1.349 | 1.32 |
| 5th | X | X | | | | 1.000 | 1.35 |
| 6th | | X | X | | | 0.892 | 1.12 |
| 7th | | X | | | X | 0.678 | 1.32 |
| 8th | X | | X | | | 0.617 | 1.10 |

Figure 3

SYSTEM AND METHOD FOR IDLE ENGINE STOP

CROSS-REFERENCE TO RELATED APPLICATION

This application is a continuation of U.S. Pat. No. 8,187, 139 issued May 29, 2012, the disclosure of which is incorporated in its entirety by reference herein.

TECHNICAL FIELD

This disclosure relates to the field of automatic transmissions for motor vehicles. More particularly, the disclosure pertains to a method of operating a motor vehicle designed to enable stopping the internal combustion engine when the vehicle is stationary.

BACKGROUND

When a motor vehicle is stationary for a period of time, such as while waiting at a traffic light, it is desirable to shut off the engine to save fuel. The engine must then be quickly re-started when the driver signals that he is ready to move again, usually by removing his foot from the brake pedal and applying pressure to the accelerator pedal. If the delay in delivering torque to the drive wheels is excessive, the driver will be unsatisfied with the vehicle. In order to minimize the delay, it is important that the transmission be prepared to transmit torque in first gear as soon as the engine is running. Traditionally, an automatic transmission is adapted for this idle engine stop feature by adding an electrically driven pump to provide hydraulic pressure to engage the appropriate friction elements.

SUMMARY

The disclosed transmission and associated operating method utilize electro-mechanically actuated brakes to engage the launch gear ratio. The electro-mechanically actuated brakes can be operated without hydraulic pressure, permitting the controller to engage a forward launch gear ratio of the transmission while the engine is shut down and therefore not driving a hydraulic pump. In some embodiments, a reverse gear ratio can also be engaged using only electro-mechanically actuated brakes.

BRIEF DESCRIPTION OF THE DRAWINGS

FIG. 2 is a table showing proposed tooth numbers for each of the gears in FIG. 1.

FIG. 3 is a table indicating the states of the clutches and resulting speed ratio of the transmission in FIG. 1 when the gears have the number of teeth indicated in FIG. 2.

DETAILED DESCRIPTION

As required, detailed embodiments of the present invention are disclosed herein; however, it is to be understood that the disclosed embodiments are merely exemplary of the invention that can be embodied in various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

Figure 1:
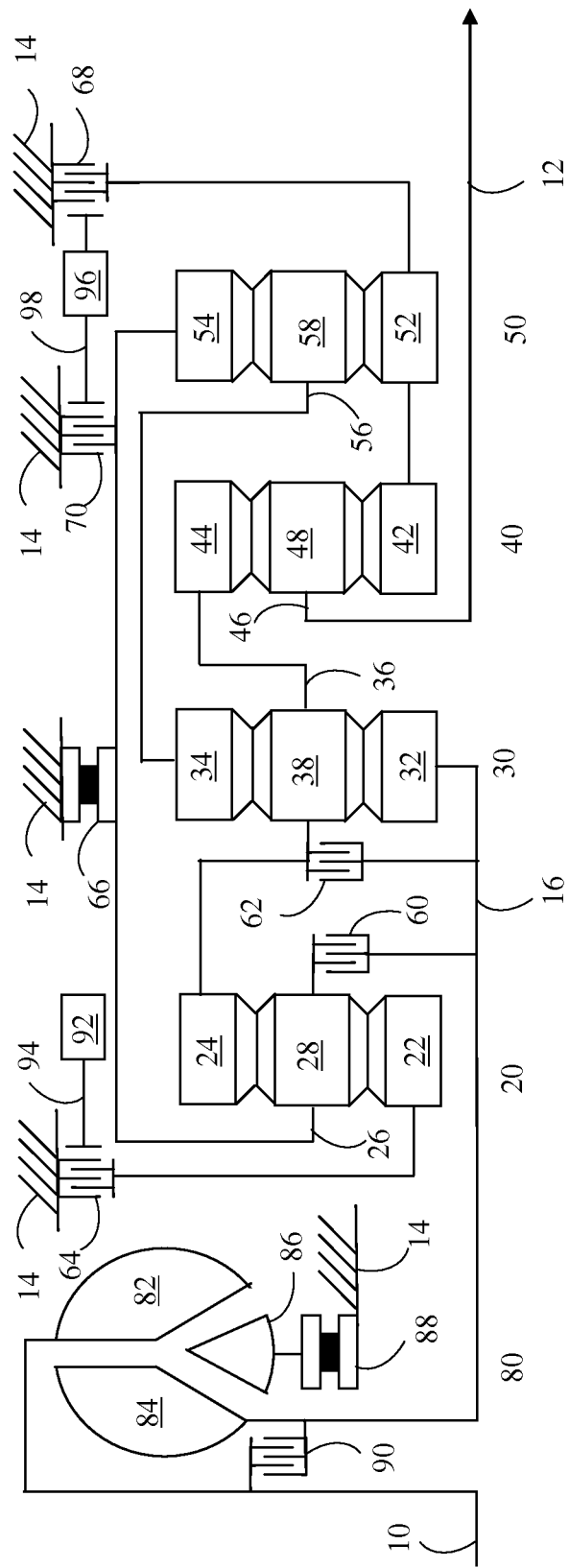
FIG. 1 is a schematic diagram of a transmission.

A transmission is illustrated in FIG. 1. The transmission contains four simple planetary gear set assemblies 20, 30, 40, and 50. Each simple planetary gear set assembly has a sun gear, a ring gear with an internal mesh, a planet carrier, and a set of planet gears supported for rotation on the carrier and meshing with both the sun gear and ring gear. A recommended number of gear teeth for each of these gears is shown in FIG. 2.

Gearbox input shaft 16 is driven by the vehicle's engine via torque converter assembly 80. The second sun gear 32 is fixed to gearbox input shaft 16. The first carrier 26 is connected to the fourth ring gear 54. The third sun gear 42 is connected to the fourth sun gear 52. The first ring gear 24, second carrier 36, and third ring gear 44 are mutually connected. A gearbox output shaft 12 drives the vehicle wheels, preferably via a driveshaft, a differential assembly, and rear axle shafts. Gearbox output shaft 12 is fixed to the third carrier 46. A transmission case 14 provides support for the gear sets, input shaft, and output shaft.

Clutches 60 and 62 are preferably hydraulically actuated friction clutches which releasably connect two elements when hydraulic pressure is applied and disconnect those elements when the hydraulic pressure is released. The hydraulic pressure is provided by an engine driven hydraulic pump and the pressurized fluid is distributed to the clutches via channels within gearbox input shaft 16. Clutch 60 releasably connects gearbox input shaft 16 to the first carrier 26 and fourth ring gear 54. Clutch 62 releasably connects gearbox input shaft 16 to the first ring gear 24, the second carrier 36, and the third ring gear 44. Clutch 62 forces all three elements of planetary gear set 30 to rotate at the same speed. This effect can alternatively be accomplished by a clutch releasably connecting any two of sun gear 32, carrier 36, and ring gear 34 to each other.

Brakes 64, 68, and 70 are preferably electro-mechanically actuated friction brakes which hold an element against rotation in response to the rotation of an electric motor and release said element when the electric motor is rotated in the opposite direction. U.S. Pat. No. 6,699,153 describes a number of suitable electro-mechanically actuated brake assemblies. Brake 64 releasably holds the first sun gear 22 against rotation. Brake 64 is applied by rotating motor 92 which moves piston 94 to create pressure on the friction plates. Brake 68 releasably holds the third sun gear 42 and fourth sun gear 52 against rotation. Brake 70 releasably holds the first carrier 26 and fourth ring gear 54 against rotation. Brakes 68 and 70 are applied by motor 96 and piston 98. Rotating motor 96 in one direction pushes piston 98 against brake 68 and rotating it in the opposite direction pushes piston 98 against brake 70. An intermediate position releases both brakes.

One way brake 66 is a passive coupler which allows the first carrier 26 and fourth ring gear 54 to rotate freely in a positive direction but prevents rotation in the opposite direction.

Torque converter assembly 80 comprises an impeller 82, stator 86, and turbine 84. Impeller 82 is driven by transmission input shaft 10. The stator 86 is connected to the transmission case 14 by one way brake 88. Torque is transmitted from the impeller to the turbine hydro-dynamically by fluid that circulates among the three elements. When the turbine is substantially slower than the impeller, one way brake 88 holds the stator stationary and it provides a reaction torque to create torque multiplication between the impeller and turbine. The one way brake overruns when the turbine speed is near or greater than the impeller speed. Hydraulically actuated lock-up clutch 90 connects the turbine to the impeller eliminating the hydro-dynamic losses of the torque converter. Careful design of the hydraulic system can reduce leakage of fluid from the torque converter sufficiently to allow idle engine shutdown for periods of several minutes, which exceeds the requirement for realizing the majority of the fuel saving benefits.

The transmission ratio is selected by applying two of the clutches and brakes as indicated in FIG. 3. In first gear, however, it is only necessary to apply one friction brake because one way brake 66 will engage passively.

Figure 4:
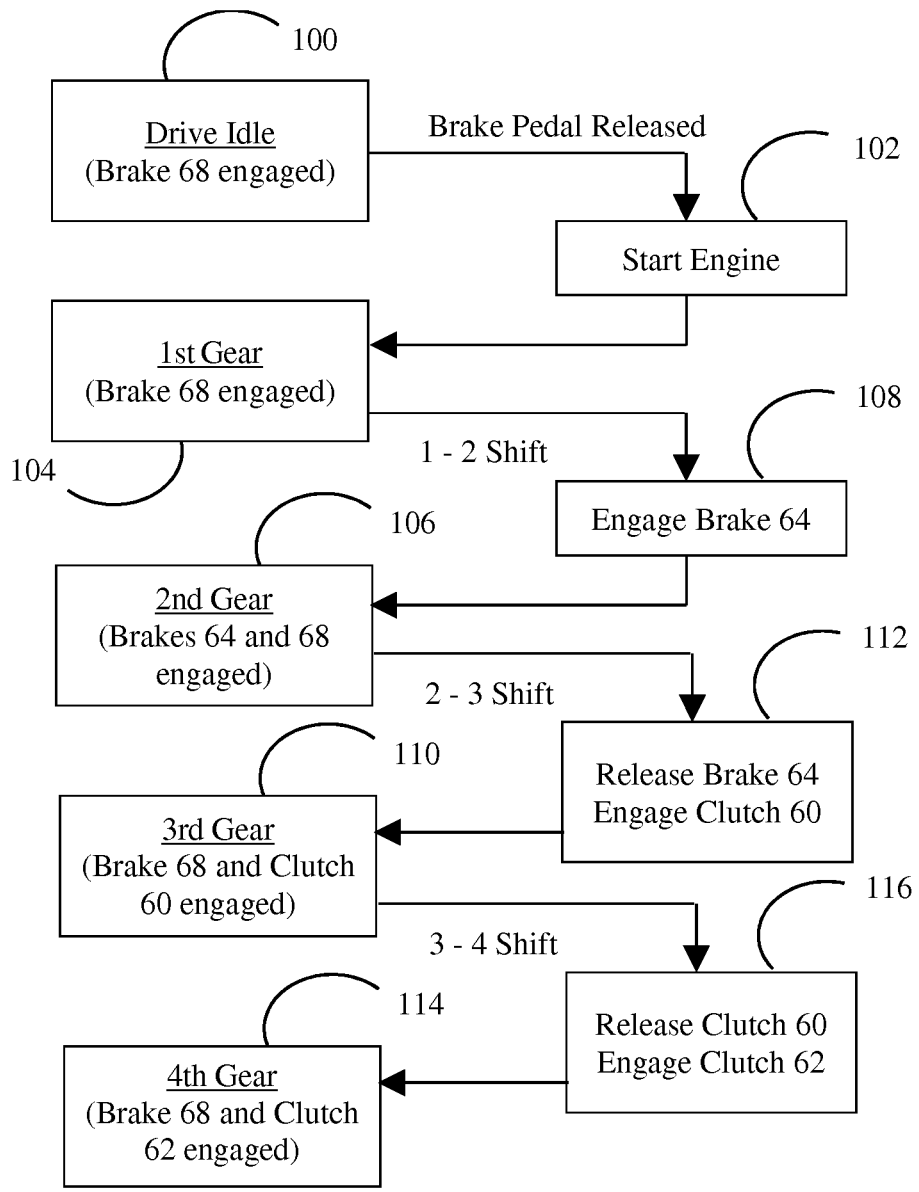
FIG. 4 is a flow chart further illustrating a method of operation of the transmission of FIG. 1.
Figure 5:
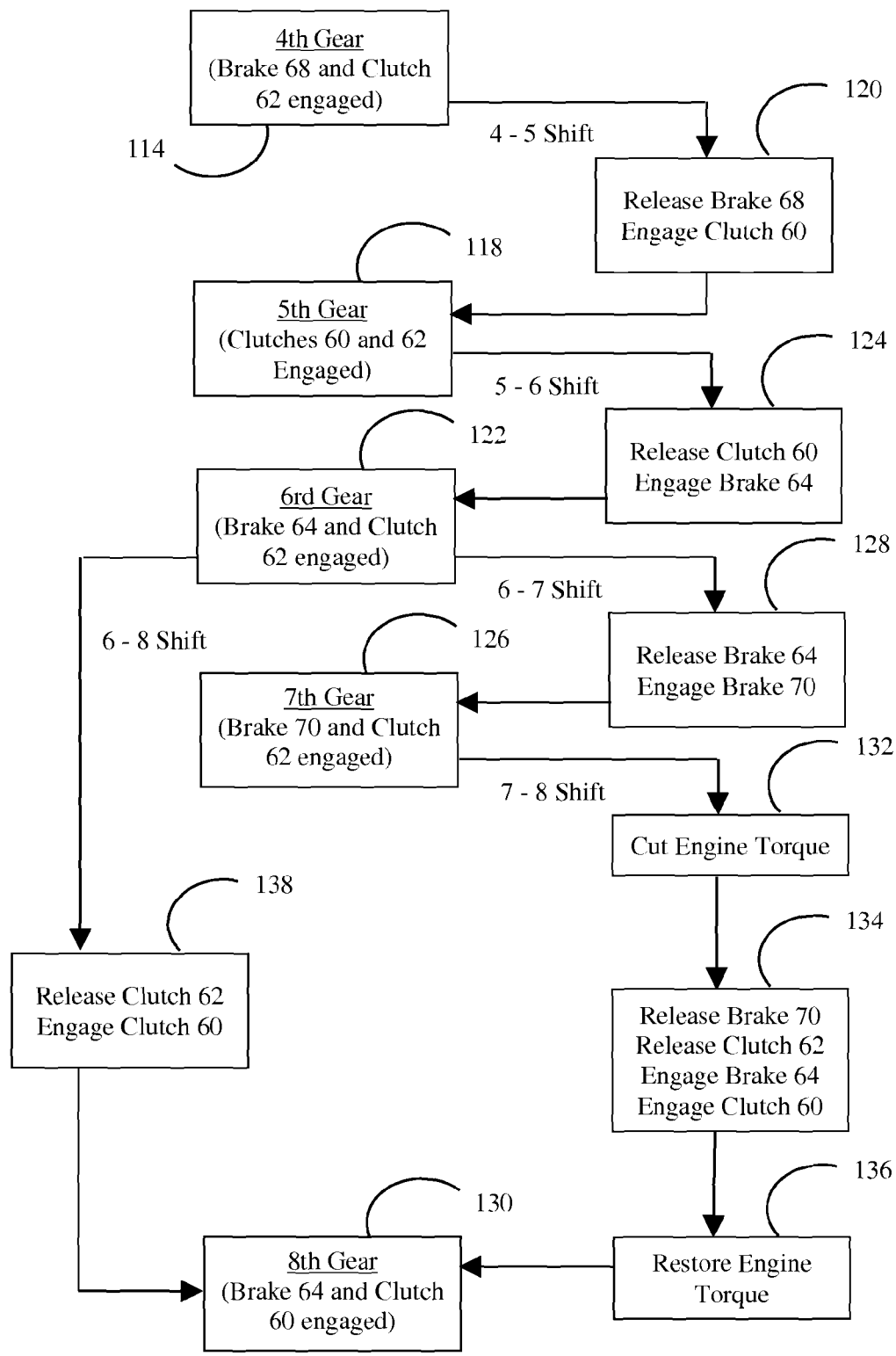
FIG. 5 is a flow chart further illustrating a method of operation of the transmission of FIG. 1.

Operation of the transmission is illustrated in the flow charts of FIGS. 4 and 5. When the vehicle is stationary in drive (forward) mode 100, the engine will generally be off, unless the idle stop feature of the control strategy is temporarily disabled for some reason, such as a drained torque converter, low coolant temperature, etc. The transmission is prepared for forward motion in first gear by rotating motor 96 to apply brake 68. When the driver signals an engine start condition, typically by releasing the brake pedal, the engine is quickly started 102. Of course, if the idle stop feature has been disabled, the engine will already be running, so this step can be skipped. The engine drives impeller 82, and hydro-dynamic forces within the torque converter generate torque on turbine 84 and gearbox input shaft 16. Brake 68 and one way brake 66 provide a reaction torque such that a multiple of the input torque is transferred to output shaft 12, accelerating the vehicle in first gear 104.

To shift to second gear 106, motor 92 is used to progressively engage brake 64, maintaining brake 68 in the fully applied state in step 108. As the torque capacity of brake 64 increases, one way brake 66 will overrun.

The engine driven hydraulic pump begins building up pressure in the valve body shortly after the engine is started. By the time the vehicle is ready to shift to third gear, hydraulic pressure is available. To shift from second gear 106 to third gear 110, clutch 60 is progressively engaged while brake 64 is progressively released in step 112. To shift from third gear 110 to fourth gear 114, clutch 62 is progressively engaged while clutch 60 is progressively released in step 116. Brake 68 is maintained in the fully applied state through all of these transitions. It is advantageous to apply lock-up clutch 90 soon after hydraulic pressure is available in order to minimize the energy loss associated with an open torque converter.

To shift from fourth gear 114 to fifth gear 118, clutch 60 is progressively engaged while brake 68 is progressively released in step 120. Fifth gear 118 is a direct drive gear. To shift from fifth gear 118 to sixth gear 122, brake 64 is progressively engaged while clutch 60 is progressively released in step 124. To shift from sixth gear 122 to seventh gear 126, brake 70 is progressively engaged while brake 64 is progressively released in step 128. Clutch 62 is maintained in the fully applied state through all of these transitions.

Eighth gear 130 provides improved fuel economy for high speed driving. Unfortunately, it is not possible to shift directly from seventh gear 126 to eighth gear 130 without interrupting the flow of power through the transmission. There are two ways to get into eighth gear. The first method is to first interrupt the engine torque 132, then release clutch 62 and brake 70 and apply clutch 60 and brake 64 in step 134, and then restore engine torque 136. The second method is to bypass seventh gear and shift from sixth gear into eighth gear by progressively engaging clutch 60 while progressively releasing clutch 62 in step 138, maintaining brake 64 in the applied state.

Downshifting to a lower gear is accomplished by reversing the steps described above for the corresponding upshift.

The transmission is also capable of operation with an idle engine stop strategy in reverse. The transmission is prepared for reverse motion by rotating motors 92 and 96 to apply brakes 64 and 70, respectively. When the driver signals his intent to move, the engine is quickly started. The engine drives impeller 82, and hydro-dynamic forces within the torque converter generate torque on turbine 84 and gearbox input shaft 16. Brakes 64 and 70 provide a reaction torque such that a multiple of the input torque, in the opposite direction of the input torque, is transferred to output shaft 12, accelerating the vehicle.

Although brakes 64, 70 and 68 are all preferably electro-mechanically controlled, certain embodiments can be implemented, with some functional limitations, with hydraulic actuation of brakes 64 and 70. Specifically, if either brake 64 or brake 70 is hydraulically actuated, the idle engine stop feature would not be available in reverse. Furthermore, if brake 64 is hydraulically actuated, then the shift from first gear to second gear could not be initiated until the engine driven hydraulic pump has had time to produce sufficient pressure in the valve body.

Figure 6:
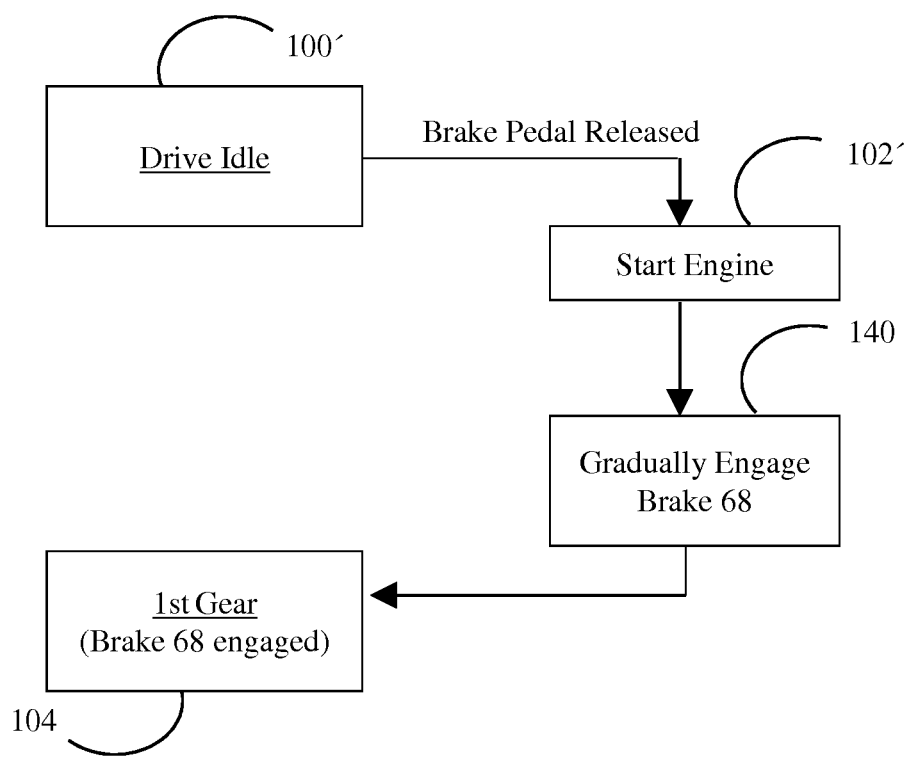
FIG. 6 is a flow chart further illustrating an alternate method of operation of the transmission of FIG. 1.

Also, embodiments can be implemented without torque converter 80 by driveably connecting gearbox input shaft 16 to transmission input shaft 10, preferably via a torsional damper. Operation of such an embodiment is illustrated in the flow chart of FIG. 6. In drive idle state 100', no clutches or brakes are engaged. When the driver releases the brake pedal, the engine is started 102' and then brake 68 is gradually engaged 140. All remaining shifts are accomplished in the manner described above and illustrated in FIGS. 4 and 5. A vehicle launch in reverse is accomplished by fully engaging either brake 70 or brake 64 and then gradually engaging the other one.

Optionally, one way brake 66 can be omitted and its function accomplished by brake 70. If one way brake 66 is omitted, however, brakes 68 and 70 would need to be operated together in first gear, and would therefore require independent actuation.

While exemplary embodiments are described above, it is not intended that these embodiments describe all possible forms of the invention. Rather, the words used in the specification are words of description rather than limitation, and it is understood that various changes can be made without departing from the spirit and scope of the invention. Additionally, the features of various implementing embodiments can be combined to form further embodiments of the invention.

What is claimed is:

1. A method for controlling a vehicle comprising:
   while the vehicle is in drive,
       commanding a first motor to actuate a first electro-mechanical transmission brake to engage a launch gear ratio of a transmission such that during an engine stop, the transmission remains engaged in the launch gear ratio;
       in response to detecting an engine stop condition, commanding an engine to stop; and
       in response to detecting an engine start condition, commanding the engine to start.

2. The method of claim 1 further comprising
while the vehicle is moving forward,
commanding a second motor to actuate a second electro-mechanical transmission brake to engage a second forward gear ratio of the transmission.

3. The method of claim 1 further comprising
while the vehicle is moving forward,
routing pressurized fluid to actuate a first clutch to engage a third forward gear ratio of the transmission.

4. The method of claim 1 further comprising
while the vehicle is moving forward,
routing pressurized fluid to actuate a torque converter lock-up clutch.

5. The method of claim 1 further comprising
while the vehicle is in reverse,
commanding a second motor to actuate a second electro-mechanical transmission brake to engage a reverse gear ratio of the transmission such that during an engine stop, the transmission remains engaged in the reverse gear ratio;
in response to detecting an engine stop condition, commanding the engine to stop; and
in response to detecting an engine start condition, commanding the engine to start.

6. A method of operating an automatic transmission including an input configured to be driven by an engine, an output configured to drive vehicle wheels, at least one electro-mechanically actuated brake, and at least one hydraulically actuated clutch, the method comprising:
while the input and output are both stationary,
commanding a first motor to actuate a first electro-mechanical transmission brake to engage a forward launch gear ratio of the transmission; and
in response to a first upshift condition,
commanding a second motor to actuate a second electro-mechanical transmission brake to engage a second forward gear ratio of the transmission.

7. The method of claim 6 further comprising
in response to a second upshift condition,
routing pressurized fluid to actuate a first clutch to engage a third forward gear ratio of the transmission.

8. The method of claim 6 further comprising
while the input and output are both rotating,
routing pressurized fluid to actuate a torque converter lock-up clutch.

9. A method of operating an automatic transmission including an input configured to be driven by an engine, an output configured to drive vehicle wheels, at least one electro-mechanically actuated brake, and at least one hydraulically actuated clutch, the method comprising:
while the input and output are both stationary,
commanding a first motor to actuate a first electro-mechanical transmission brake to engage a forward launch gear ratio of the transmission; and
commanding a second motor to actuate a second electro-mechanical transmission brake to engage a reverse gear ratio of the transmission.

10. A transmission comprising:
a collection of planetary gear sets, friction clutches, friction brakes, and passive couplers arranged to transmit torque following an engine restart event and to provide multiple forward speed ratios and at least one reverse speed ratio; and
a motor configured to actuate one of the friction brakes to selectively prevent a first sun gear and a second sun gear from rotating to select a first of the forward speed ratios with all other friction clutches and friction brakes disengaged.

11. The transmission of claim 10 wherein the collection includes a passive coupler configured to prevent at least one planetary gear element of the planetary gear sets from rotating in the first of the forward speed ratios.

* * * * *